(12) United States Patent
Dijk et al.

(10) Patent No.: US 9,553,936 B2
(45) Date of Patent: Jan. 24, 2017

(54) TARGETING OF DIGITAL CONTENT TO GEOGRAPHIC REGIONS

(71) Applicant: Google Inc., Mountain View, CA (US)

(72) Inventors: Luuk van Dijk, Zurich (CH); Jeffrey D. Oldham, San Jose, CA (US); Hartmut Maennel, Zurich (CH); Krzysztof Duleba, Zurich (CH); Zoltan Szamonek, Zurich (CH); Fiona Herring, London (GB); Aileen Tang, Union City, CA (US)

(73) Assignee: Google Inc., Mountain View, CA (US)

( * ) Notice: Subject to any disclaimer, the term of this patent is extended or adjusted under 35 U.S.C. 154(b) by 749 days.

(21) Appl. No.: 13/838,898

(22) Filed: Mar. 15, 2013

(65) Prior Publication Data

US 2015/0169629 A1  Jun. 18, 2015

(51) Int. Cl.
    *G06F 7/00*    (2006.01)
    *H04L 29/08*   (2006.01)
    *G06Q 30/02*   (2012.01)
    *H04W 4/02*    (2009.01)

(52) U.S. Cl.
    CPC .......... *H04L 67/20* (2013.01); *G06Q 30/0251* (2013.01); *H04W 4/021* (2013.01)

(58) Field of Classification Search
    CPC ................................................ G06F 17/30241
    USPC ......................................................... 707/724
    See application file for complete search history.

(56) References Cited

U.S. PATENT DOCUMENTS

| | | | | |
|---|---|---|---|---|
| 6,665,715 B1 * | 12/2003 | Houri | ...................... | H04L 29/06 709/204 |
| 7,062,572 B1 * | 6/2006 | Hampton | .......... | H04L 29/12009 709/217 |
| 7,296,088 B1 * | 11/2007 | Padmanabhan | ......... | H04L 45/04 709/238 |
| 7,376,714 B1 * | 5/2008 | Gerken | .................. | G06Q 30/02 709/219 |
| 7,634,463 B1 * | 12/2009 | Katragadda | ............ | G06Q 10/10 701/431 |
| 7,949,714 B1 | 5/2011 | Burnim | | |
| 8,402,387 B1 * | 3/2013 | Iversen | .............. | G06Q 30/0242 715/789 |
| 8,554,852 B2 | 10/2013 | Burnim | | |

(Continued)

FOREIGN PATENT DOCUMENTS

WO    WO2010036525 A2    4/2010

*Primary Examiner* — Alex Gofman
*Assistant Examiner* — Michael Le
(74) *Attorney, Agent, or Firm* — Fish & Richardson P.C.

(57) ABSTRACT

Methods, systems, and apparatus, including computer programs encoded on computer storage media, for improving geographic targeting of digital content. One of the methods includes receiving a targeting request that identifies a target geographic region; identifying one or more groups of geographic regions that each include at least two geographic regions, including the target geographic region, wherein the one or more groups of geographic regions are identified based on respective combined targeting accuracies, the respective combined targeting accuracy of each of the one or more groups being higher than a targeting accuracy for the target geographic region; and providing data describing the identified one or more groups of geographic regions in response to the targeting request.

14 Claims, 3 Drawing Sheets

(56) References Cited

U.S. PATENT DOCUMENTS

| | | | |
|---|---|---|---|
| 8,676,799 B1* | 3/2014 | Vaver | G06K 9/6272 707/736 |
| 8,788,326 B1* | 7/2014 | Epperson | G06Q 30/0251 705/14.1 |
| 2003/0023489 A1* | 1/2003 | McGuire | G06Q 30/02 705/14.55 |
| 2003/0074471 A1* | 4/2003 | Anderson | H04L 29/12009 709/245 |
| 2003/0101454 A1* | 5/2003 | Ozer | G06Q 30/02 725/42 |
| 2004/0267611 A1* | 12/2004 | Hoerenz | G06Q 10/0637 705/14.13 |
| 2005/0071417 A1* | 3/2005 | Taylor | G06Q 30/02 709/200 |
| 2005/0131762 A1* | 6/2005 | Bharat | G06Q 10/00 705/14.66 |
| 2005/0187823 A1* | 8/2005 | Howes | G06Q 30/02 705/14.58 |
| 2006/0026067 A1* | 2/2006 | Nicholas | G06Q 30/00 705/14.58 |
| 2006/0282328 A1* | 12/2006 | Gerace | G06F 17/30867 705/14.66 |
| 2007/0133385 A1* | 6/2007 | Hoek | G06F 17/3087 370/201 |
| 2008/0016055 A1* | 1/2008 | Riise | G06F 17/3087 |
| 2008/0244046 A1* | 10/2008 | Campbell | H04W 4/02 709/222 |
| 2008/0288312 A1* | 11/2008 | Miles | G06Q 30/02 705/7.34 |
| 2009/0037602 A1* | 2/2009 | Patel | H04L 29/12047 709/245 |
| 2009/0125321 A1* | 5/2009 | Charlebois | G06Q 30/02 705/346 |
| 2009/0197582 A1* | 8/2009 | Lewis | H04W 4/02 455/414.2 |
| 2009/0298480 A1* | 12/2009 | Khambete | G06F 17/30699 455/414.1 |
| 2010/0036710 A1* | 2/2010 | Ames | G06Q 30/02 705/29 |
| 2010/0287178 A1* | 11/2010 | Lambert | G06Q 30/02 707/765 |
| 2010/0312646 A1 | 12/2010 | Gupta et al. | |
| 2011/0035288 A1* | 2/2011 | Clyne | G06Q 30/02 705/14.71 |
| 2011/0087547 A1* | 4/2011 | Amaro | G06Q 30/02 705/14.53 |
| 2011/0137902 A1* | 6/2011 | Wable | G06F 17/30867 707/737 |
| 2012/0166285 A1* | 6/2012 | Shapiro | G06Q 30/0251 705/14.58 |
| 2012/0239479 A1* | 9/2012 | Amaro | G06Q 20/102 705/14.23 |
| 2012/0284118 A1 | 11/2012 | Mamich et al. | |
| 2013/0060633 A1* | 3/2013 | St-Pierre | G06Q 30/0251 705/14.58 |
| 2013/0060640 A1* | 3/2013 | Gadhia | H04L 67/18 705/14.58 |
| 2013/0067110 A1* | 3/2013 | Sarawat | H04L 61/2517 709/238 |
| 2013/0080250 A1* | 3/2013 | Lee | G06Q 30/02 705/14.49 |
| 2013/0142438 A1* | 6/2013 | Schloegel | G06T 7/0083 382/199 |
| 2013/0226937 A1* | 8/2013 | Moritz | G06F 17/3087 707/748 |
| 2014/0032326 A1* | 1/2014 | Li | G06Q 30/0261 705/14.58 |
| 2014/0101685 A1* | 4/2014 | Kitts | H04N 21/44213 725/14 |

* cited by examiner

TARGETING OF DIGITAL CONTENT TO GEOGRAPHIC REGIONS

BACKGROUND

This specification relates to improving targeting of digital content to geographic regions.

Internet Protocol (IP) addresses associated with computing devices can be geolocated to identify geographic regions within which the computing devices are likely located. Digital content, e.g., advertisements, can be targeted to computing devices in particular geographic regions based on this geolocation data.

This specification describes techniques that interoperate with a communication targeting system that stores data measuring Internet traffic that originates from particular geographic regions. The system also stores data describing targeting accuracies associated with blocks of IP addresses ("IP blocks") and geographic regions. Each IP block represents a non-intersecting range of IP addresses in a subnet. The targeting accuracy is measured as a probability that IP addresses in a particular IP block are associated with computing devices that are located in a particular geographic region. For example, a particular IP block and a geographic region "Mountain View, Calif." can have a targeting accuracy of 30 percent, which indicates that there is a 30 percent chance that IP addresses in the IP block are associated with computing devices that are located in "Mountain View, Calif." Additionally, the system stores data describing estimated population counts associated with IP blocks and geographic regions. Data measuring Internet traffic and describing targeting accuracies is available for geographic regions at varying levels of granularity, e.g., by country, state, region, city, postal code, or kind of region.

SUMMARY

This specification describes how a system can identify similar geographic regions that can be targeted along with a particular geographic region to increase the targeting accuracy. Similarity between geographic regions is determined by clustering geographic regions based on targeting accuracies associated with IP blocks and the respective geographic regions. When a user identifies a target geographic region, the clusters of geographic regions can be evaluated to identify one or more similar geographic regions that can be targeted in addition to the initially identified target geographic region. The use can select as targets one or more of the identified similar geographic regions in addition to the initially identified target geographic region. As a result, the user can increase the overall targeting accuracy.

In general, one innovative aspect of the subject matter described in this specification can be embodied in methods that include the actions of receiving a targeting request that identifies a target geographic region; identifying one or more groups of geographic regions that each include at least two geographic regions, including the target geographic region, wherein the one or more groups of geographic regions are identified based on respective combined targeting accuracies, the respective combined targeting accuracy of each of the one or more groups being higher than a targeting accuracy for the target geographic region; and providing data describing the identified one or more groups of geographic regions in response to the targeting request.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. Identifying one or more groups of geographic regions includes: obtaining data representing one or more pre-computed clusters of geographic regions; identifying, from among the one or more pre-computed clusters of geographic regions, a first cluster that includes the target geographic region; and identifying the one or more groups of geographic regions from geographic regions that are in the first cluster. The method further includes determining a combined targeting accuracy for each of the one or more groups of geographic regions that are in the first cluster.

In general, one innovative aspect of the subject matter described in this specification can be embodied in methods that include the actions of determining a plurality of similarity values for a respective plurality of pairs of geographic regions, wherein each similarity value represents an aggregate targeting accuracy for a corresponding pair of geographic regions based on targeting accuracies of IP address blocks that geolocate to the geographic regions of the pair; and generating a plurality of clusters of geographic regions based on the plurality of similarity values, wherein each geographic region in a cluster has pair-wise similarity values with other geographic regions in the cluster that are greater than a threshold.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. Determining a plurality of similarity values for each of a plurality of pairs of geographic regions further comprises adjusting each similarity value based on a geographic distance between the geographic regions of the corresponding pair. Adjusting each similarity value comprises dividing the similarity value by the distance between the geographic regions of the corresponding pair. Generating a plurality of clusters of geographic regions based on the similarity values further includes: constructing, based on the determined plurality of similarity values for the plurality of pairs of geographic regions, a geographic region similarity graph; and generating the plurality of clusters of geographic regions from the geographic region similarity graph.

The subject matter described in this specification can be implemented in particular embodiments so as to realize one or more of the following advantages. Geographic regions that are similar to one another based on shared Internet traffic can be identified. Users targeting a particular geographic region can be presented with the option of targeting one or more similar geographic regions along with the particular geographic region. Digital content can be targeted to the similar geographic regions to increase the targeting accuracy. The target audience for advertising campaigns can be increased by targeting one or more similar geographic regions along with a particular geographic region.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
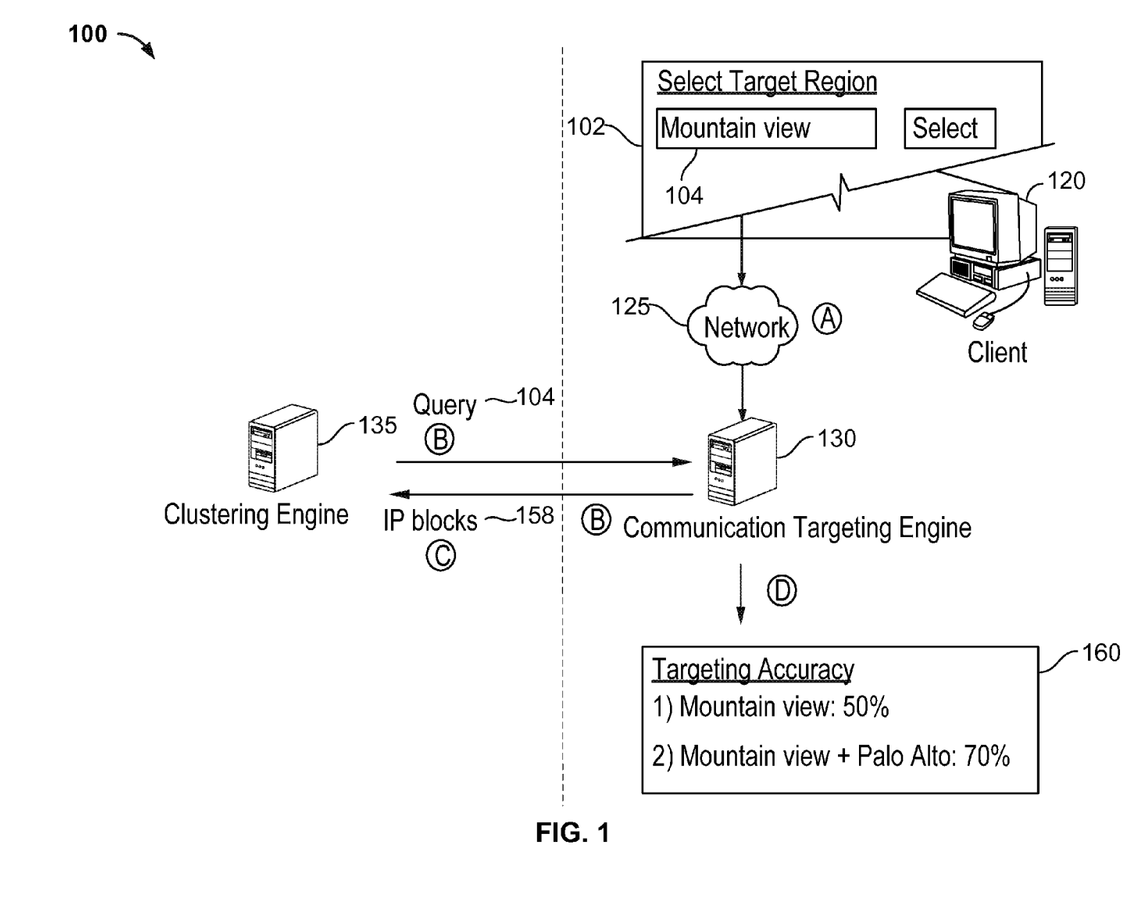
FIG. 1 is a block diagram of an example system that can identify similar geographic regions that can be targeted along with a specified geographic region to increase a targeting accuracy.

FIG. 1 is a block diagram of an example system 100 that can identify similar geographic regions that can be targeted along with a specified geographic region to increase a targeting accuracy. The system 100 is an example of a communication delivery system implemented as one or more computer programs on one or more computers in one or more locations, in which the systems, components, and techniques described below can be implemented. The system 100 includes a communication targeting system 130 and a clustering engine 135.

The system 100 receives an input, which will be referred to as a "targeting request," that identifies a target geographic region. For example, an advertiser can specify a target region for a group of advertisements. In general, a user or an autonomous system or agent can specify a region to which content should be directed. The target geographic region can be a country, region, state, city, postal code, or kind of region.

In some implementations, a user operating a user device 120 can enter a targeting request 104 through a communication targeting system home page 102 to the communication targeting system 130 through a data communication network 125, e.g., a local area network (LAN) or wide area network (WAN), e.g., the Internet, or a combination of networks.

The user device 120 will generally include a memory, e.g., a random access memory (RAM), for storing instructions and data and a processor for executing stored instructions. The memory can include both read only and writable memory. The user device 120 can be a personal computer of some kind, e.g., a cloud client device, a smartphone, or a personal digital assistant. The user device 120 can run an application program, e.g., a web browser, that can interact with the communication targeting system 130 to display web pages, e.g., the communication targeting system home page 102, that provide a user interface to the communication targeting system 130 for the user of the user device 120.

The communication targeting system 130 can identify one or more IP blocks that correspond to the geographic region specified in the request 104, together with a respective targeting accuracy for the identified IP blocks and the geographic region. An IP block corresponds to a geographic region when the IP block includes a threshold percentage of IP addresses that are associated with computing devices located in the geographic region. For example, the communication targeting system 130 can identify an IP block j that is associated with the city "Mountain View, Calif." and a respective targeting accuracy of 50 percent.

The communication targeting system 130 submits the targeting request 104, or other data identifying the specific target region, to the clustering engine 135. The communication targeting system 130 and the clustering engine 135 can communicate directly or through the network 125.

The clustering engine 135 can be implemented as one or more computer program modules installed on one or more computers. The clustering engine 135 can communicate with the communication targeting system 130 to obtain data 158 measuring Internet traffic that originates from particular geographic regions, IP blocks associated with the particular geographic regions, and respective targeting accuracies for the IP blocks and the particular geographic regions.

The clustering engine 135 can use data obtained from the communication targeting system 130 to identify (i) one or more other geographic regions that can be targeted along with the target geographic region specified and (ii) an aggregate targeting accuracy. For example, the clustering engine 135 can identify a geographic region "Palo Alto, Calif." that can be targeted along with the geographic region "Mountain View, Calif." and an aggregate targeting accuracy of 70 percent. In some implementations, the clustering engine 135 identifies the other geographic regions by evaluating clusters of geographic regions that were generated using various clustering techniques, e.g., spectral clustering, as will be described in reference to FIG. 3.

The communication targeting system 130 can provide the identified geographic regions and respective aggregate targeting accuracies to the user device 120 for presentation to the user on a targeting interface 160 that is displayed on the user device 120. Based on this information, the user can decide whether to target only the geographic region that was specified in the request 104, or to target additional geographic regions along with the specified geographic region.

Figure 2:
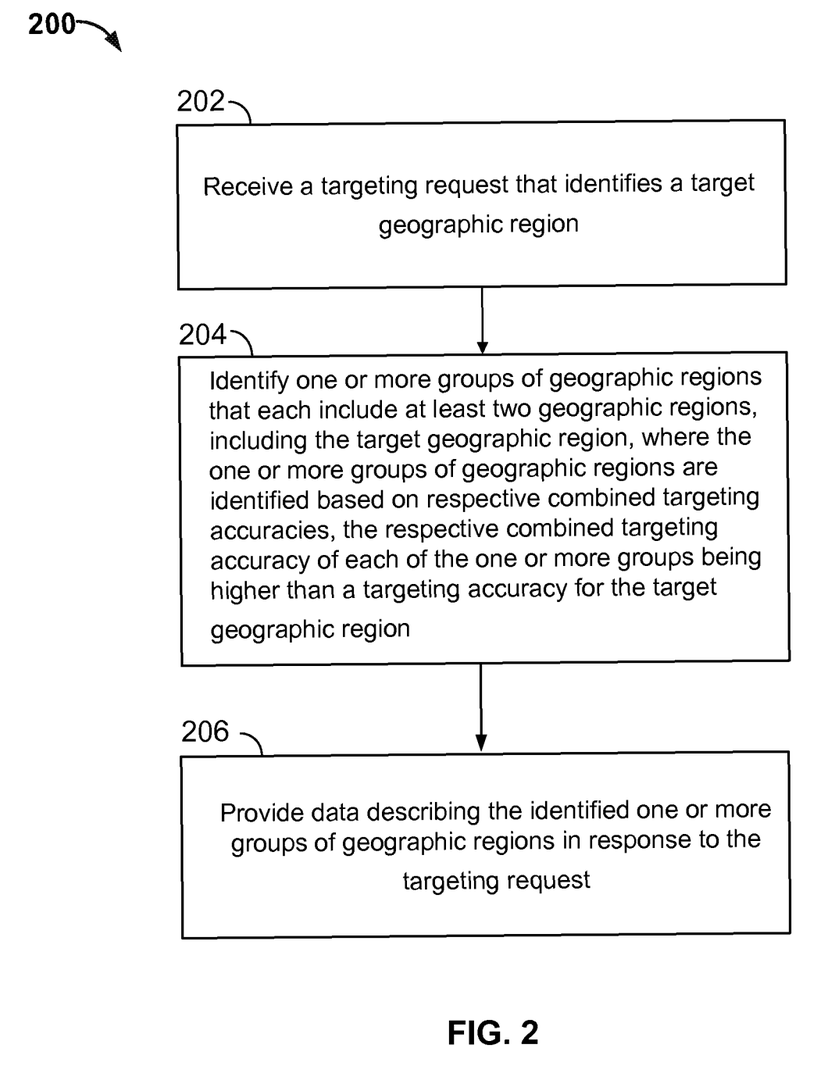
FIG. 2 is a flow diagram of an example process for identifying similar geographic regions that can be targeted along with a geographic region to increase a targeting accuracy.

FIG. 2 is a flow diagram of an example process for identifying similar geographic regions that can be targeted along with a particular selected geographic region to increase a targeting accuracy. For convenience, the process 200 will be described as performed by a system including one or more computing devices. For example, a system 100, as described in reference to FIG. 1, appropriately programmed, can be used to perform the process 200.

The system receives a targeting request that identifies a target geographic region (202). The target geographic region can be a country, region, state, city, postal code, or kind of region. In some implementations, the system determines that the targeting request identifies a target geographic region by matching the target geographic region name with names of geographic regions in an index. For example, a target geographic region can be said to match a geographic region included in an index if the geographic region name is within a predetermined string edit distance of the target geographic region name.

The system identifies one or more groups of geographic regions that each include at least two geographic regions, including the target geographic region (204). The one or more groups of geographic regions are identified based on respective combined targeting accuracies, the respective combined targeting accuracy of each of the one or more groups being higher than a targeting accuracy for the target geographic region. Each group contains the target region and one or more other, similar regions. Similarity is determined based on respective aggregate targeting accuracies, as will be described below. In some implementations, the system pre-computes clusters of geographic regions that are similar to each other, as will be described in reference to FIG. 3. The system then identifies geographic regions similar to a target region by identifying a cluster that includes the target region.

A combined aggregate targeting accuracy can be determined based on a combined similarity function, as will be described in reference to FIG. 3. The one or more groups can also be identified based on a threshold combined targeting accuracy or respective costs for targeting the one or more groups. A cost can be, for example, a cost of sending an advertisement or other communication to the addresses associated with the group. A cost can be approximated by the size of the population associated with the group.

In some implementations, the system pre-computes and stores, in an index, for each of multiple target regions, the one or more groups that include the target region, respective combined targeting accuracies, and respective estimated population counts. In some implementations, the system uses the index to provide data describing one or more groups for a target geographic region in response to a targeting request identifying a particular target region.

For example, for a geographic region "Palo Alto," the system can identify a first group including "Palo Alto" and "Mountain View," a second group including "Palo Alto" and "Redwood City," and a third group including "Palo Alto," "Mountain View," and "Redwood City," assuming that each of these groups has a combined aggregate targeting accuracy that is higher than the targeting accuracy for "Palo Alto." In identifying a group of similar geographic regions for a particular geographic region, the system can evaluate geographic regions that share a border with the particular geographic region, geographic regions that do not share a border with the particular geographic region, or both.

The system provides data describing the identified one or more groups of geographic regions in response to the targeting request (206). The user can evaluate the respective aggregate targeting accuracies and select one or more of identified similar geographic regions to be targeted in addition to the target geographic region.

Figure 3:
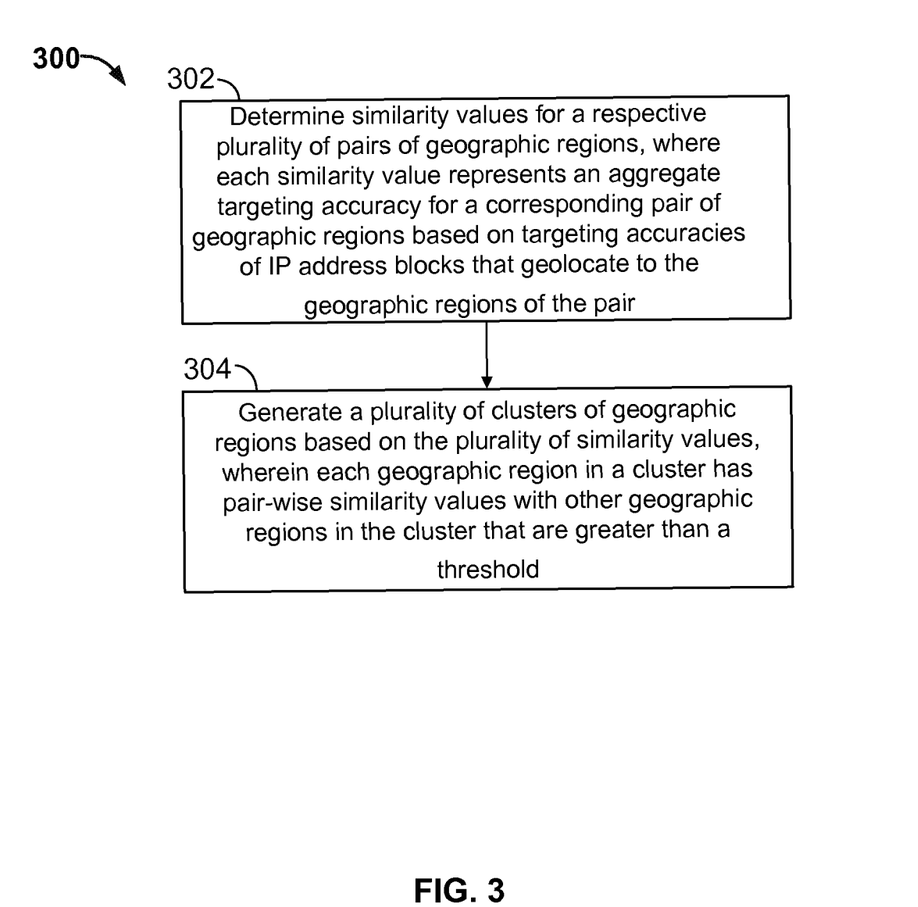
FIG. 3 is a flow diagram of an example process for clustering geographic regions.

FIG. 3 is a flow diagram of an example process for clustering geographic regions. For convenience, the process 300 will be described as performed by a system including one or more appropriately programmed computing devices. For example, a clustering engine 135, as described in reference to FIG. 1, can be used to perform the process 300.

The system determines similarity values for respective pairs of geographic regions (302). Each similarity value represents an aggregate targeting accuracy for a corresponding pair of geographic regions based on targeting accuracies of IP address blocks that geolocate to the geographic regions of the pair. In some implementations, the similarity value represents an aggregate targeting accuracy for computing devices that are located in either of the geographic regions of the pair.

One example similarity function for determining a similarity between a pair of geographic regions can be expressed as:

$$s_{i,j} = \sum_k \frac{\min(b_{k,i}, b_{k,j})}{t_i + t_j}$$

where i is a first geographic region of the pair, j is a second geographic region of the pair, $s_{i,j}$ is the similarity between geographic regions i and j, k is an IP block, $b_{k,i}$ is the targeting accuracy associated with the IP block k and the geographic region i, $b_{k,j}$ is the targeting accuracy associated with a IP block k and a geographic region j, $t_i$ is the amount of Internet traffic that originates from the first geographic region i, and $t_j$ is the amount of Internet traffic that originates from the second geographic region j.

The similarity determined for a pair of geographic regions may not account for geographical distances between the two geographic regions. Thus, adjustments may be needed to make it less likely that geographic regions that are not located close to one another are identified as being similar. In some implementations, the similarity determined for a pair of geographic regions is adjusted based on a geographic distance between the two geographic regions before generating clusters of the geographic regions. In some implementations, the similarity determined for a pair of geographic regions is divided by the geographic distance between the two geographic regions. In some implementations, the similarity determined for a pair of geographic regions is divided by a square root of the geographic distance between the two geographic regions.

The similarity function described above can be modified to determine a combined aggregate targeting accuracy for three or more geographic regions. One example modified similarity function for determining a combined aggregate targeting accuracy for three geographic regions can be expressed as:

$$s_{h,i,j} = \sum_k \frac{\min(b_{k,h}, b_{k,i}, b_{k,j})}{t_h + t_i + t_j}$$

where h is a first geographic region, i is a second geographic region, j is a third geographic region, $s_{h,i,j}$ is the similarity between geographic regions h, i and j, k is an IP block, $b_{k,h}$ is the targeting accuracy associated with the IP block k and the geographic region h, $b_{k,i}$ is the targeting accuracy associated with the IP block k and the geographic region i, $b_{k,j}$ is the targeting accuracy associated with a IP block k and a geographic region j, $t_h$ is the amount of Internet traffic that originates from the first geographic region h, $t_i$ is the amount of Internet traffic that originates from the second geographic region i, and $t_j$ is the amount of Internet traffic that originates from the third geographic region j.

The system generates clusters of geographic regions based on the similarity values (304). Each geographic region in a cluster has pair-wise similarity values with other geographic regions in the cluster that are greater than a threshold. The system can optionally construct different similarity graphs for different geographic region types. For example, the system can construct different geographic region similarity graphs for countries, states, cities, postal codes, and other kinds of regions. Each similarity graph has vertices and edges. In some implementations, the similarity graph is a fully connected graph. Each vertex in the similarity graph represents a particular geographic region, e.g., a city. Each edge connecting a first and second vertex has a weight based on a similarity determined for the geographic regions that correspond to the first and second vertices. For example, the weight can be the similarity $s_{i,j}$ determined as described above.

The system can generate geographic region clusters using various clustering techniques, e.g., k-means clustering. As a result, geographic regions that are similar to one another are included in the same cluster. Data identifying the generated clusters can be stored and used to identify geographic regions that are similar to a particular geographic region, as described in reference to FIG. 2. In some implementations, the number of clusters that are generated is a global system parameter. In some implementations, the number of clusters is specified by a user at the time the user submits a targeting request. The number of generated clusters can affect the number of geographic regions that are identified as being similar to a particular geographic region. For example, fewer clusters may result in more geographic regions being included in a particular cluster.

In some implementations, the number of clusters that are generated is function of the number of geographic regions that are being clustered. One example function for determining the number of clusters to be generated can be expressed as:

$$c = \sqrt{n}$$

where c is the number of clusters to be generated and n is the number of geographic regions that are being clustered.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method executed using one or more computers, the method comprising:

receiving, by the one or more computers and from a user device, a targeting request to target a piece of digital content to users in a target geographic region, wherein the targeting request includes one or more Internet Protocol blocks corresponding to the target geographic region;

obtaining, by the one or more computers, a targeting accuracy for the target geographic region, the targeting accuracy for a geographic region representing an accuracy with which a data processing system can determine whether a computing device is located in the geographic region;

identifying, by the one or more computers, a plurality of groups of candidate geographic regions that each include:
  (i) the target geographic region, and
  (ii) at least one other geographic region that is determined to be similar to the target geographic region based at least on an analysis of data associated with the Internet Protocol blocks corresponding to the target region;

selecting, by the one or more computers, a particular group of geographic regions from among the plurality of groups of candidate geographic regions that has a combined targeting accuracy greater than the targeting accuracy for the target geographic region; and providing, by the one or more computer and for presentation on the user device, a targeting interface that:
  (i) displays data indicating the particular group of geographic regions that was selected from the plurality of groups of candidate geographic regions, and
  (ii) adds the at least one other geographic region, that is included in the particular group of geographic regions, to the target geographic region to which the piece of digital content is to be targeted, upon selection of the particular group of geographic regions by user input at the user device.

2. The method of claim 1, wherein identifying the plurality of groups of candidate geographic regions comprises:
  obtaining data representing one or more pre-computed clusters of geographic regions;
  identifying, from among the one or more pre-computed clusters of geographic regions, a first cluster that includes the target geographic region; and
  identifying the plurality of groups of candidate geographic regions from geographic regions that are included within the first cluster.

3. The method of claim 2, further comprising:
  determining a combined targeting accuracy for each of the plurality of groups of candidate geographic regions that are included within the first cluster.

4. A computer-implemented method executed by one or more computers, the method comprising:
  determining, by the one or more computers, a respective similarity value for each of a plurality of pairs of geographic regions, wherein each similarity value represents an aggregate targeting accuracy for a corresponding pair of geographic regions based on targeting accuracies of Internet Protocol address blocks that geo-locate to the geographic regions of the pair;
  generating, by the one or more computers, a plurality of clusters of geographic regions based on the plurality of similarity values, wherein each geographic region in a cluster has a respective pair-wise similarity value with each other geographic region in the cluster that is greater than a threshold;

receiving, by the one or more computers and from a user device, a targeting request to target a piece of digital content to users in a target geographic region, wherein the targeting request includes one or more Internet Protocol blocks corresponding to the target geographic region;

obtaining, by the one or more computers, a targeting accuracy for the target geographic region, the targeting accuracy for a geographic region representing an accuracy with which a data processing system can determine whether a computing device is located in the geographic region;

identifying, by the one or more computers, a particular cluster, from among the plurality of clusters of the geographic region, that:
  (i) includes the target geographic region,
  (ii) includes at least one other geographic region that is determined to be similar to the target geographic region based at least on the data associated with the Internet Protocol blocks corresponding to the target region, and
  (iii) has a combined targeting accuracy greater than the target targeting accuracy for the target geographic region;

providing, by the one or more computers and for presentation on the user device, a targeting interface that:
  (i) displays data indicating the particular cluster of geographic regions, and
  (ii) adds the at least one other geographic region to the target geographic region to which the piece of digital content is to be targeted upon selection of the particular cluster of geographic regions by user input at the user device.

5. The method of claim 4, wherein determining the respective similarity value for each of a plurality of pairs of geographic regions further comprises adjusting each similarity value based on a geographic distance between the geographic regions of the corresponding pair.

6. The method of claim 5, wherein adjusting each similarity value comprises dividing the similarity value by the distance between the geographic regions of the corresponding pair.

7. The method of claim 4, wherein generating a plurality of clusters of geographic regions based on the similarity values further comprises:
constructing, based on the determined plurality of similarity values for the plurality of pairs of geographic regions, a geographic region similarity graph; and
generating the plurality of clusters of geographic regions from the geographic region similarity graph.

8. A system comprising:
one or more computers and one or more storage devices storing instructions that are operable, when executed by the one or more computers, to cause the one or more computers to perform operations comprising:
receiving, by the one or more computers and from a user device, a targeting request to target a piece of digital content to users in a target geographic region, wherein the targeting request includes one or more Internet Protocol blocks corresponding to the target geographic region;
obtaining, by the one or more computers, a targeting accuracy for the target geographic region, the targeting accuracy for a geographic region representing an accuracy with which a data processing system can determine whether a computing device is located in the geographic region;
identifying, by the one or more computers, a plurality of groups of candidate geographic regions that each include:
  (i) the target geographic region, and
  (ii) at least one other geographic region that is determined to be similar to the target geographic region based at least on an analysis of data associated with the Internet Protocol blocks corresponding to the target region;
selecting, by the one or more computers, a particular group of geographic regions from among the plurality of groups of candidate geographic regions that has a combined targeting accuracy greater than the targeting accuracy for the target geographic region; and
providing, by the one or more computers and for presentation on the user device, a targeting interface that:
  (i) displays data indicating the particular group of geographic regions that was selected from the plurality of candidate groups of geographic regions, and
  (ii) adds the at least one other geographic region to the target geographic region to which the piece of digital content is to be targeted upon selection of the particular group of geographic regions by user input at the user device.

9. The system of claim 8, wherein identifying the plurality of one or more groups of candidate geographic regions comprises:
obtaining data representing one or more pre-computed clusters of geographic regions;
identifying, from among the one or more pre-computed clusters of geographic regions, a first clusters that includes the target geographic region; and
identifying the plurality of groups of candidate geographic regions from geographic regions that are included within the first cluster.

10. The system of claim 9, wherein the operations further comprise:
determining a combined targeting accuracy for each of the plurality of groups of candidate geographic regions that are included within the first cluster.

11. A system comprising:
one or more computers and one or more storage devices storing instructions that are operable, when executed by the one or more computers, to cause the one or more computers to perform operations comprising:
determining, by the one or more computers, a respective similarity value for each of a plurality of pairs of geographic regions, wherein each similarity value represents an aggregate targeting accuracy for a corresponding pair of geographic regions based on targeting accuracies of Internet Protocol address blocks that geo-locate to the geographic regions of the pair;
generating, by the one or more computers, a plurality of clusters of geographic regions based on the plurality of similarity values, wherein each geographic region in a cluster has a respective pair-wise similarity value with each other geographic region in the cluster that is greater than a threshold;
receiving, by the one or more computers and form a user device, a targeting request to target a piece of digital content to users in a target geographic region, wherein the targeting request includes one or more Internet Protocol blocks corresponding to the target geographic region;
obtaining, by the one or more computers, a targeting accuracy for the target geographic region, the targeting accuracy for a geographic region representing an accuracy with which a data processing system can determine whether a computing device is located in the geographic region;

identifying, by the one or more computers, a particular cluster, from among the plurality of clusters of the geographic regions, that:
(i) includes the target geographic region,
(ii) includes at least one other geographic region that is determined to be similar to the target geographic region based at least on the data associated with the Internet Protocol blocks corresponding to the target region, and
(iii) has a combined targeting accuracy greater than the targeting accuracy for the target geographic region;

providing, by the one or more computers and for presentation on the user device, a targeting interface that:
(i) displays data indicating the particular cluster of geographic regions, and
(ii) adds the at least one other geographic region to the target geographic region to which the piece of digital content is to be targeted upon selection of the particular cluster of geographic regions by user input at the user device.

12. The system of claim 11, wherein determining the respective similarity value for each of a plurality of pairs of geographic regions further comprises adjusting each similarity value based on a geographic distance between the geographic regions of the corresponding pair.

13. The system of claim 12, wherein adjusting each similarity value comprises dividing the similarity value by the distance between the geographic regions of the corresponding pair.

14. The system of claim 11, wherein generating a plurality of clusters of geographic regions based on the similarity values further comprises:
constructing, based on the determined plurality of similarity values for the plurality of pairs of geographic regions, a geographic region similarity graph; and
generating the plurality of clusters of geographic regions form the geographic region similarity graph.

* * * * *